United States Patent [19]

Dufour

[11] 4,329,272

[45] May 11, 1982

[54] FLAME-RETARDANT POLYMERS

[75] Inventor: Daniel L. Dufour, Longmeadow, Mass.

[73] Assignee: Monsanto Company, St. Louis, Mo.

[21] Appl. No.: 244,577

[22] Filed: Mar. 17, 1981

[51] Int. Cl.³ .................. C08K 5/02; C08L 37/00; C08L 51/00; C08K 5/49

[52] U.S. Cl. .................. 524/288; 525/74; 525/207; 524/343; 524/371; 524/373; 524/467; 524/504; 524/469

[58] Field of Search .................. 525/207, 74; 260/33.8 UA, 45.7 R, 45.95 R, 45.85 P

[56] References Cited

U.S. PATENT DOCUMENTS

| | | | |
|---|---|---|---|
| 3,626,033 | 12/1971 | Keskkula et al. | 525/207 |
| 3,632,839 | 1/1972 | Young et al. | 525/207 |
| 3,641,212 | 2/1972 | Narayana et al. | 525/207 |
| 3,717,688 | 2/1973 | Kayanagi et al. | 525/78 |
| 3,720,734 | 3/1973 | Kopacki et al. | 525/207 |
| 3,759,863 | 9/1973 | Czekay et al. | 260/33.6 AQ |
| 3,882,192 | 5/1975 | Elghani et al. | 525/67 |
| 3,887,639 | 6/1975 | Kopacki et al. | 525/83 |
| 3,919,354 | 11/1975 | Moore et al. | 525/261 |
| 4,048,263 | 9/1977 | Lee | 525/207 |
| 4,205,140 | 5/1980 | Liebig et al. | 525/74 |
| 4,234,701 | 11/1980 | Abolins et al. | 525/74 |
| 4,269,950 | 5/1981 | Abolins et al. | 525/74 |

FOREIGN PATENT DOCUMENTS

| | | | |
|---|---|---|---|
| 900079 | 5/1972 | Canada . | |
| 1624 | 5/1979 | European Pat. Off. | 525/74 |
| 1354000 | 5/1974 | United Kingdom . | |

OTHER PUBLICATIONS

Derwent Abst., 7945 V/05 2-17-73, Torayind, "Impact Resistant Thermoplastics".

Chem. Abst., vol. 92 (111614x) 1980, "Flame Retardant Action of Decabromodiphenyl Oxide on Polystyrene".

Chem. Abst., vol. 90-39649b, 1979, Larkin et al. "Flame Retarding Halogen-Containing Polymer Compositions".

*Primary Examiner*—Herbert J. Lilling
*Attorney, Agent, or Firm*—David Bennett; William J. Farrington; Paul D. Matukaitis

[57] ABSTRACT

Styrene/maleic anhydride polymers can be made more resistant to combustion by incorporation therein of minor amounts of polyvinyl chloride. The compositions can also comprise MBS, ABS and other flame retardant additives.

4 Claims, No Drawings

FLAME-RETARDANT POLYMERS

BACKGROUND OF THE INVENTION

This invention relates to flame retardant polymers and particularly to fire retardant terpolymers of styrene and maleic anhydride.

Polymers of styrene and maleic anhydride are well known for their high heat distortion temperature but they have the limitation that they burn when ignited. For many end uses a polymeric molding composition is required to be flame-retardant to meet the applicable safety codes.

The present invention provides a route towards flame retardant compositions based on styrene/maleic anhydride polymers that also retain good strength and molding characteristics.

While it is known that polyvinyl chloride is resistant to burning, its use as a flame retardant additive may be impeded if this requires significant sacrifice of other desirable properties such as impact strength.

DESCRIPTION OF PRIOR ART

Both styrene/maleic anhydride copolymers and polyvinyl chloride are known in the art and U.S. Pat. No. 3,626,033 teaches high heat deformation and high impact vinyl chloride molding resins by incorporating therein minor amounts of ABS and a styrene/maleic anhydride copolymer.

DESCRIPTION OF THE INVENTION

The present invention provides a molding composition comprising:
  A. from 20 to 85% by weight of a uniform polymer comprising 50 to 85% by weight of a vinylaromatic monomer, from 15 to 30% by weight of an unsaturated dicarboxylic acid anhydride and from 0 to 20% of a copolymerizable monomer;
  B. from 15 to 40% by weight of polyvinyl chloride; and
  C. from 0 to 40% by weight of a composition comprising a graft copolymer of from 20 to 40% by weight of a monomer selected from the group consisting of methyl methacrylate and acrylonitrile and 80 to 60% by weight of a vinyl aromatic monomer, said copolymer being grafted on to from 10 to 60% of the weight of the composition of a substrate rubber having a glass transition temperature below 0° C.

The presence of Component C is a desirable expedient if the product needs to have good strength properties. However its inclusion renders the effectiveness of the PVC (Component B) less and in such event to obtain very good flame retardant characteristics, an added flame retardant may be employed. In such compositions the preferred flame retardants include decabromodiphenylether, halogenated (di)methanodibenzocyclooctene adducts, halogenated paraffin hydrocarbons, halogenated octadiene-cyclopentadiene adducts, tetrabromobisphenol A, tetrabromoxylene, pentabromoethylbenzene, tetrabromobisphenol A diacetate, and bis(tribromophenoxy)ethane. In general the amount of such additive present can be from 1 to 10% by weight of the total composition.

Component A of the polyblend is conventionally a styrene/maleic anhydride copolymer or preferably a terpolymer comprising in addition methyl methacrylate. However the styrene component can be replaced in whole or in part by other vinylaromatic monomers such as α-methyl styrene, bromostyrene, chlorostyrene, p-methylstyrene and vinyl toluene. Likewise the anhydride component can be supplied in whole or in part by itaconic, citraconic or aconitic anhydride. The copolymerizable monomer is conventionally selected from $C_1$ to $C_3$ acrylates and methacrylates and unsaturated nitriles. Typically comonomers are methyl methacrylate, ethyl acrylate and acrylonitrile. In a preferred terpolymer the anhydride provides from 20 to 30% and methyl methacrylate provides from 5 to 15% of the Component A polymer weight.

The polymer has a uniform composition and in practice this implies controlled late addition of the anhydride in the manner taught for example in U.S. Pat. No. 2,971,939 and 3,336,267.

Component B of the polyblend is polyvinyl chloride and it is understood that this term also is intended to embrace various degrees of halogenation of a basic hydrocarbon chain. Thus the term includes halogenated polyvinyl chloride and halogenated polyethylene as well as simple polyvinyl chloride which is the most common exemplar of such compounds. The preferred Component B is a conventional polyvinyl chloride of the kind typically sold for molding applications. The proportion of component B actually used depends largely on the desired properties of the product. It is however found that when Component C is present it is desirable to use from 30 to 40% by weight of Component B, not only for good flame retardance but also because a beneficial effect on the impact properties is revealed.

Component C is conventionally an ABS or an MBS; that is, a terpolymer of acrylonitrile or methyl methacrylate, butadiene and styrene formed by polymerizing the other monomers in the presence of a butadiene-based rubber. Both these compositions are known to be compatible with both PVC and styrene/maleic anhydride copolymers and to function as impact improvers to both.

Component C can however be varied in composition beyond the above conventional formulations. Thus the styrene can be replaced in whole or in part by monomers such as α-methylstyrene, chlorostyrene, bromostyrene, p-methylstyrene or vinyl toluene and the like. The rubber need not be based on butadiene but can be provided by polyisoprene, polychloroprene, polypentenamer, EPDM rubbers and acrylate rubbers. The rubber can also be a diene-based block or radial block-type rubber.

The proportion of Component C is determined by the properties of the desired product. However where it is used, best results are obtained with a proportion no greater than that of Component A. Particular preferred polyblends of the invention comprise from 30 to 40% of each of Components A and C.

In addition to the three components A, B and C described above and the optional flame retardant additive the compositions of the invention can further comprise flame retardant adjuvants such as antimony oxide, stabilizers, plasticizers, antioxidants, fillers, mineral fibers, pigments and the like in appropriate amounts.

The components of the polyblend can be blended in any convenient manner but the most suitable technique involves the use of a compounder-extruder or a banbury mixer.

DESCRIPTION OF THE PREFERRED EMBODIMENTS

The invention is now described with reference to the following example which is for the purposes of illustration only and is not intended to imply any limitation on the essential scope of the invention.

The components described below were blended in a number of different ratios and tested for various properties.

ABS 1—prepared by the graft emulsion polymerization of acrylonitrile and styrene in a weight ratio of 30:70 in the presence of polybutadiene. ABS-1 contains 40% by weight of polybutadiene.

ABS 2—prepared by the graft suspension polymerization of acrylonitrile and styrene in a weight ratio of 28:72 in the presence of polybutadiene. ABS-2 contains 14% by weight of polybutadiene.

S/MA/MM—prepared by polymerizing a monomer mixture of styrene, maleic anhydride and methyl methacrylate to produce uniform polymer composition in which the above monomers are the weight proportions 68:26:6 respectively.

PVC—Rucon B-221 (Hooker Chemical Co.)

MBS—Acryloid-K 653 (Rohm and Haas Co.) a methylmethacrylate butadiene/styrene terpolymer.

Plasticizers/Flow Aids—Butyl Stearate Acryloid K-175—(Rohm and Haas), an acrylic polymer Antioxidants/Stabilizer Ethanox 330—an alkylated phenol available from Ethyl Corp.

Mark 1900—a methyl tin mercapto-ester complex available from Argus Chemical Co.

EXAMPLE

The components indicated in Table 1 below were formulated and tested for their DTUL, (using ASTM D 648.56 on a 12.7 mm×12.7 mm cross-section sample), and Izod impact (using ASTM method D-256.56) Gardner impact was assessed on a 2.54 mm thick sample using a 1.27 cm diameter dart.

The samples were also tested for flammability using the UL-94 "V" test and "HB" test. (1)

(1) "Materials designated 'fire or flame-retardant' generally are more difficult to ignite or once ignited, burn at a slower rate than corresponding conventional materials. These terms do not mean that fire-retardant materials will not burn. However, when properly used, Monsanto fire-retardant additives and materials are useful in helping customers formulate or construct finished products meeting specified fire codes and regulations."

TABLE 1

| FORMULATIONS & PROPERTIES | | | | | | | |
|---|---|---|---|---|---|---|---|
| | Comparative | | | Invention | | | |
| Polymer Components (phr) | C1 | C2 | C3 | 1 | 2 | 3 | 4 |
| ABS-1 | | | 38 | 30.4 | 22.8 | | |
| ABS-2 | | | 12 | 9.6 | 7.2 | | |
| S/MA/MM | | 100 | 50 | 40 | 30 | 70 | 50 |
| PVC | 100 | | | 20 | 40 | 30 | 25 |
| MBS | | | | | | 25 | 25 |
| Stabilizers/Antioxidants | | | | | | | |
| Ethanox 330 | | | | 0.3 | 0.3 | 0.3 | 0.3 |
| Mark 1900 | | | | 0.8 | 1.6 | 1.2 | 1.2 |
| Plasticizers | | | | | | | |
| Butyl Stearate | | | | 1.0 | 1.0 | | |
| K-175 | | | | | | 0.3 | 1.0 |
| Properties | | | | | | | |
| DTUL (°C.) | 69 | 135 | 112 | 105 | 100 | 125 | 105 |
| Izod (J/M notch) | 32 | 11 | 150 | 32 | 49 | 39 | 27 |
| Gardner (J) | 1.7 | .1 | 8.6 | 2.3 | >24 | <.1 | .3 |
| UL Tests | | | | | | | |
| "HB" ratings | Pass | Fail | Pass | Marg. Fail | Pass | | Marg. Fail |
| -Dripping | No | Yes | | No | No | No | No |
| "V" rating | V-O+ | Fail | | | V-2 | | |
| -Dripping | No | Yes | | | No | | |

From the data on Table 1 it can be seen that, at the levels of reinforcement contemplated, ABS performs somewhat better than MBS. It can also be seen that certain formulations are substantially superior to others in their strength properties particularly Gardner impact. It is considered probable that these represent compositions of significantly greater compatibility than other marginally different systems. An example of this effect is provided by a comparison of formulations 1 and 2 where an enormous increase in Gardner impact is obtained for a relatively minor adjustment in the formulation. Moreover although the blend contains 40% PVC the DTUL is still 31° C. higher than for PVC alone.

What is claimed is:

1. A molding composition comprising:
    A. from 30 to 40% by weight of a uniform polymer comprising 50 to 85% by weight of a vinylaromatic monomer, from 15 to 30% by weight of an unsaturated dicarboxylic acid anhydride and from 0 to 20% of a copolymerizable monomer;
    B. from 30 to 40% by weight of polyvinyl chloride; and
    C. from 30 to 40% by weight of a composition comprising a graft copolymer of from 20 to 40% by weight of a monomer selected from the group consisting of methyl methacrylate and acrylonitrile and 80 to 60% by weight of a vinyl aromatic monomer, said copolymer being grafted on to from 10 to 60% of the weight of the composition of a substrate rubber having a glass transition temperature below 0° C.

2. A composition according to claim 1 comprising from 1 to 10% by weight of a flame retardant additive selected from the group consisting of decabromodiphenylether, halogenated (di)methanodibenzocyclooctene adducts, halogenated paraffin hydrocarbons, halogenated octadienecyclopentadiene adducts, tetrabromobisphenol A, tetrabromoxylene, pentabromoethylbenzene, tetrabromobisphenol A diacetate, and bis(-tribromophenoxy)ethane.

3. A composition according to claim 1 in which Component A comprises a copolymerizable monomer selected from the group consisting of $C_1$ to $C_3$ acrylates and methacrylates and unsaturated nitriles.

4. A composition according to claim 3 in which Component A comprises from 5 to 15% by weight of methyl methacrylate.

* * * * *